Figure 1:
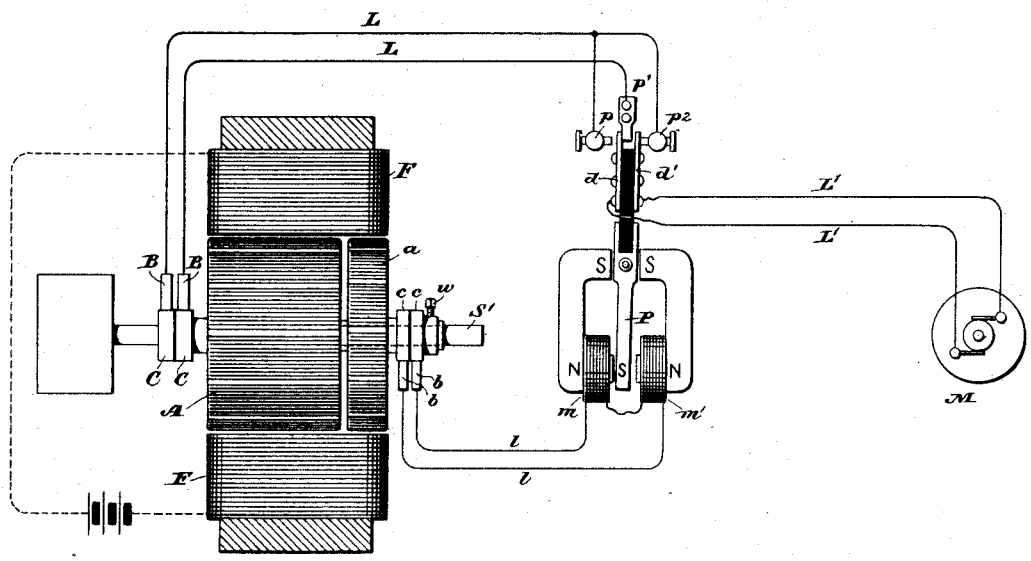

(No Model.)

F. ANDERSON.
APPARATUS FOR RECTIFYING ELECTRIC CURRENTS.

No. 429,109. Patented June 3, 1890.

Witnesses
Geo. W. Breck.
A. V. Hiney.

Inventor
Frank Anderson
By his Attorneys
Paget & Kintner

UNITED STATES PATENT OFFICE.

FRANK ANDERSON, OF PEEKSKILL, NEW YORK.

APPARATUS FOR RECTIFYING ELECTRIC CURRENTS.

SPECIFICATION forming part of Letters Patent No. 429,109, dated June 3, 1890.

Application filed November 20, 1889. Serial No. 331,005. (No model.)

*To all whom it may concern:*

Be it known that I, FRANK ANDERSON, a citizen of the United States, residing at Peekskill, in the county of Westchester, in the State of New York, have invented certain new and useful Improvements in Apparatus for the Distribution and Commutation of Electric Currents, of which the following is a specification.

My invention relates, generically, to the procuring in two electric circuits, one of which is auxiliary to the other, of two alternating electric currents, with any required difference of phase of undulation of each current relatively to the other, and specifically my invention includes the employment of one of these currents of a certain phase to actuate a commuting apparatus in and at the periods of time proper to convert the alternating current of differentiated phase into a continuous or direct current. I prefer to employ what I will term the "auxiliary current" to actuate the commuting apparatus, the current converted being the main or principal current. My object in this specific employment is to avoid sparking or arcing at the contact-pieces of the commuting apparatus, and this I effect by causing the phase of the auxiliary current so to precede or lag behind the phase of the principal current as to actuate the commuting apparatus previously or subsequently to the sparking period of the phase of the principal current.

Heretofore differences of phase in alternating currents have been procured by employing induction apparatus termed "transformers" or "converters," in which the primary current would have a difference of about one-quarter phase in advance of the secondary current. To obtain phases differing in other ratios than that of one-quarter, (the phase of the primary being in advance,) I am aware that "impedance" coils have been employed; but, so far as I am aware, none of these devices nor combinations attain the procurement of all or any differences of phase; but, on the contrary, the difference of phase procurable is limited by principles difficult to reduce to use, except in very limited departures from certain normal differentiations of phase. In fact, it is impossible by such means to obtain a phase in the secondary in advance of the phase in the primary, except by the device of adjusting the phases of different waves, that of the preceding wave in the secondary being so far caused to lag as to appear to be consequent upon the incident wave in the primary.

By my invention any required difference of phase is easily and promptly procured, and to the auxiliary current that difference of phase is adjustably given, so as to meet the requirements of breaking contact at the commuting apparatus at a period of low potential difference between the contact-pieces.

My invention is illustrated in the accompanying drawing, in which—

Figure 2:
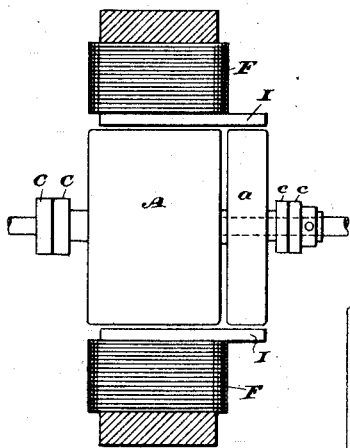
Figure 3:
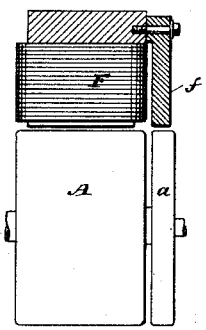
Figure 4:
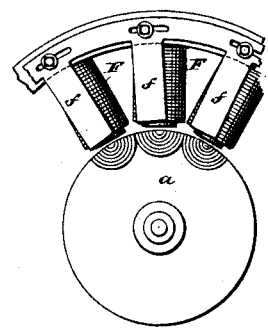
Figure 5:
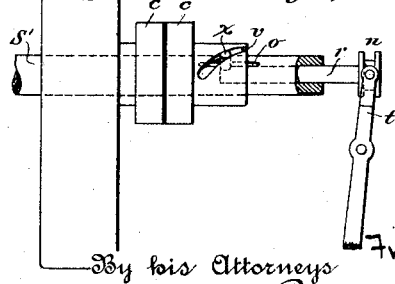

Figure 1 shows diagrammatically the arrangement of the apparatus and the circuit connections. Fig. 2 is a part sectional view showing polar extensions to include the auxiliary armature. Figs. 3 and 4 are respectively side and end views of modified arrangements of parts. Fig. 5 is an elevation showing how the auxiliary armature may be adjusted during the running of the dynamo-machine.

The same letters correspond to like parts throughout the drawings.

F F are field-magnets excited in any convenient manner.

A is the principal armature of the dynamo-machine, which armature is fixed upon the shaft S', and is provided with current-collector C C and brushes B B, connected to the principal circuit L L.

$a$ is an auxiliary armature, capable of being adjustably fixed upon the shaft S by the set-screw $w$, or preferably by the means shown in Fig. 5.

$c\ c$ is the current-collector for this armature $a$, and is mounted on a sleeve carrying the armature-hub, so as to be revolved with the armature, and thereby prevent strain upon the connecting-wires.

$b\ b$ are the brushes to this collector connected to the auxiliary circuit $l\ l$.

The armature A is suitably wound to produce the main or principal current, and the armature $a$ to produce the auxiliary current. Generally A will give a large quantity of current, while the requirements of the auxiliary circuit will be met with a small current from $a$. The coils should be equal in number in the two armatures.

$p\ p'\ p^2$, Fig. 1, are the fixed contact-pieces of a polarized relay, of which $d\ d'$ are the moving contact-pieces attached to the movable arm P, polarized by the permanent magnets NS SN, on the poles of which are wound the usual coils $m\ m'$, connected to the auxiliary circuit 11. In circuit with $d\ d'$ are the conductors L' L', leading to the motor M, or other translating device requiring a continuous or direct current.

Where, as in Fig. 1, the relative position of $a$ to A is adjusted by means of a set-screw or equivalent means, the machine, if in motion, must be stopped, in order to make the adjustment. I employ the devices shown in Figs. 5, 4, and 3 to avoid such stoppage.

In Fig. 5 the shaft S is shown bored up from the end and fitted up with a loose mandrel $r$. This mandrel carries at one end a flanged runner $n$, in which bears the fork of a set-over arm $t$, by the setting of which the mandrel may be adjusted and fixed in any desired position longitudinally in the shaft S' without interrupting the revolution of the shaft.

The mandrel $r$ carries a set-pin $x$, which may be moved along the slot $o$ in the shaft S' by movement of the mandrel and set-over arm. This set-pin $x$ also moves in the curved slot $v$, cut into the sleeve that carries the connector $c\ c$ and armature $a$. The curvature of this slot is such as to carry the sleeve through that arc of a revolution included between the center lines of two adjacent field-magnets when the pin $x$ is moved longitudinally through the slot $o$. The sleeve and armature being incapable of longitudinal movement and restricted therefrom by collars or equivalent devices, (not shown,) longitudinal movement of the pin $x$, due to the setting over of the arm $t$, causes the sleeve and armature $a$ to assume different angular relations in the plane of rotation with regard to a fixed point on the shaft, according to the amount of longitudinal movement, and consequently the armature $a$ to assume different angular relations to the armature A, which is fixed on the shaft.

In Figs. 3 and 4 is shown a substitute mode of producing difference of current phase in the coils on the armatures A and $a$ by adjustment of a false pole-piece or magnetic mass $f\ f$. In this case the armature $a$ is fixed on the shaft and in relation to A. The magnetic mass $f\ f$ is set over in the one direction or the other relatively to the principal field-magnets F F, so that the induced magnetic lines of the magnetic circuit $f\ f$ and $a$ are inductively acting in advance of or subsequently to the magnetic lines of the magnetic circuit F F and A, thereby producing waves of electrical current in an advanced or retarded phase relatively to the phase of the waves in A.

Fig. 2 shows how the armature $a$ may be included within polar extensions I I of the field-magnets F F, instead of being directly placed under said field-magnets, as in Fig. 1.

Although my invention might in certain cases be operatively carried into effect with the armatures $a$ and A in distinct magnetic fields, this would not be so generally, nor in any case where the main current in A was large or otherwise caused great reactive magnetic effect of the armature A upon the magnetic flow from the field-magnets F. Unless the armature $a$ revolved in the same distorted field (produced by these reactions) as A, the waves of electrical current in $a$ would not be of the same conformation, and probably thereby not of the same phase as in A, for which reason I prefer to revolve both armatures in the same field, repeating that thereby I procure waves of similar conformation in each armature.

The operation of my specific invention is as follows: It being desired to commute the alternating current in L L to a continuous or direct current in L' L', and the connections between the several apparatus being established, as described and shown in Fig. 1, adjustment is made of the angular position of the armature $a$ relatively to that of A, so that contact between $d'$ and $p'$ or $p^2$, and between $d$ and $p$ or $p'$ is made or broken when the wave in L L is passing the zero-line of potential difference, the arm of the relay being actuated by the auxiliary current in 11, and its effect on the magnet-coils $m\ m'$ in the manner well known or easily understood by those skilled in the art. There being no potential difference between the points $p$ and $d$ or $p'$ and $d$ or $d'$ and $p'$ or $d'$ and $p^2$, on rupture of the circuit there will be no spark or arc. Consequently the commuting of the current will be under the otherwise known action of the apparatus, continuous and without interruption, as would otherwise occur from the destruction of the contact-points.

Having thus described my invention, what I claim, and desire to procure by Letters Patent of the United States, is—

1. An armature for an alternate-current dynamo having two sets of bobbins, one of which is fixed to the shaft and the other adjustable, substantially as described.

2. A dynamo-machine having an armature made of two rotary parts, one of which is fixed on the shaft, while the other is adjustable in the direction of rotation, substantially as described.

3. A dynamo-electric machine having two armatures on a common shaft, one fixed and the other adjustable in the direction of rotation, with means for adjusting the movable armature, substantially as described.

4. The combination of the following elements: a dynamo-machine adapted to give alternating impulses in a working-circuit, means located in the working-circuit for rectifying the currents therein generated, a separate circuit from an independent armature of the same dynamo including electrical connections for controlling the current-rectifier, and a direct current-translating device located in the main circuit at a point beyond the current-rectifier, said independent armature being adjustable, substantially as described.

5. An alternating-current dynamo having two armatures on a common shaft, one of which furnishes currents for a working-circuit, the other being adjustable and connected through an independent circuit to a current-rectifier having connection with the working-circuit, whereby the working-circuit currents are caused to flow always in the same direction, substantially as described.

FRANK ANDERSON.

Witnesses:
C. J. KINTNER,
A. V. HINEY.